United States Patent [19]

Severson et al.

[11] 4,271,403

[45] Jun. 2, 1981

[54] COAXIAL CABLE SWITCHING CIRCUIT

[75] Inventors: Verne L. Severson, Minneapolis; Charles E. Tomfohrde, Minnetonka, both of Minn.

[73] Assignee: Data 100 Corporation, Minnetonka, Minn.

[21] Appl. No.: 879,744

[22] Filed: Feb. 21, 1978

[51] Int. Cl.³ .......................... H04Q 9/00; H04N 5/22
[52] U.S. Cl. .................................. 340/147 C; 358/86; 358/181; 358/185
[58] Field of Search ........................ 340/147 C, 152 T; 358/86, 92, 139, 181, 185, 194; 333/7 R, 17 R, 24 R, 24 C; 343/876; 328/111; 178/68; 179/2 TV

[56] References Cited

U.S. PATENT DOCUMENTS

| 2,876,279 | 3/1959 | Fuller | 358/86 |
|---|---|---|---|
| 3,654,708 | 4/1972 | Brudner | 179/2 TV |
| 3,671,671 | 6/1962 | Watanabe | 178/68 |
| 3,691,295 | 9/1972 | Fisk | 358/142 |
| 3,801,735 | 4/1974 | Gabriel | 358/86 |
| 3,827,026 | 7/1974 | Viswanathan | 178/68 |
| 3,828,263 | 8/1974 | Blomenkamp | 328/111 |
| 3,828,281 | 8/1974 | Chambers, Jr. | 333/17 |
| 3,845,240 | 10/1974 | Alaily | 179/2 TV |
| 3,862,356 | 1/1975 | Olson et al. | 358/139 |
| 3,869,564 | 3/1975 | Colodny | 358/86 |
| 4,037,250 | 7/1977 | McGahan et al. | 358/181 |
| 4,048,620 | 9/1977 | Crandall | 340/163 |
| 4,129,855 | 12/1978 | Rodrian | 340/152 T |

Primary Examiner—Donald J. Yusko
Attorney, Agent, or Firm—Daniel M. Rosen

[57] ABSTRACT

A coaxial cable switching circuit includes a differential comparator connected to a cable to be switched, for receiving a switching pulse therefrom. The output of the differential comparator is connected to a pulse width discriminating circuit which in turn controls a coaxial switch enabling selective interconnection of the coaxial cable with a pair of further coaxial cables. The pulse switching circuit may include a latching device, enabling the alternate connection of the further coaxial cables to the cable to which the switching pulse is applied.

3 Claims, 11 Drawing Figures

COAXIAL CABLE SWITCHING CIRCUIT

This invention relates to switches for interconnecting signal transmission paths, and is particularly directed to the provision of a switch adapted to selectively interconnect a common coaxial cable with a pair of further coaxial cables.

In systems of the type to which the present invention is directed, it is frequently desired to enable the application of video signals to a video output terminal from a plurality of video signal sources, such as video controllers. In previous systems employed to enable such switching, an additional cable may be required to carry the switch control signal to the coaxial switch. Other previous coaxial switch systems, responsive to radio frequency energy, are not responsive to the type of signal to which the present invention is directed—which is often digital and not frequency or amplitude modulated. In still other previous systems wherein the switch control signal was transmitted digitally on the same coaxial cables being switched, it was necessary to provide a reference level in a comparator used to detect the digital control signal. It has been found, however, especially in the case of a highly complex digital signal such as a composite video signal which has been distorted by the attenuation effects of long coaxial lines and subject to common mode noise, that such derivation of the reference level was not reliable without a highly complex frequency compensating pre-amplifier. Such additional requirements necessarily increased the cost and complexity of the switching systems.

The present invention is therefore directed to the provision of a pulse detection system particularly adaptable for use with coaxial cables, in order to enable the switching of the cables.

Briefly stated, in accordance with the invention, a pulse detection circuit is provided comprising a differential comparator, with high input impedances provided at the inputs of the comparator. These high impedance input circuits are adapted to be connected to the shield and center conductor of a coaxial cable. As a consequence, due to the use of high input impedances, no termination is required for the interconnection, on the coaxial cable. This system further obviates the necessity for filtration to obtain a reference signal, since the use of a differential comparator connected in this manner to the coaxial cable cancels out the effect of common mode signals. The existence of signals on the shields of the coaxial cable thus does not interfere with the operation of the circuit.

It is a further feature of the invention that the coaxial cable switching system may further derive the switching pulses, for effecting the switching of the video controllers, by operation of a keyboard at the input-output terminal of the system, which may include the keyboard display device. The system in accordance with the present invention is thereby particularly adaptable for use with terminals including cathode-ray tubes and keyboards.

In a further feature of the invention, a pulse width discriminator may be provided for receiving the output of the differential comparators, in order to distinguish the switching pulses from other signals derived both from the video controllers and the keyboard. Such discriminator may additionally include a latching circuit, such as a flip-flop, in order to enable the alternate selection of a pair of video controllers for interconnection with the input-output terminal.

In order that the invention will be more clearly understood, it will now be disclosed in greater detail with reference to the accompanying drawings, wherein.

Figure 1:
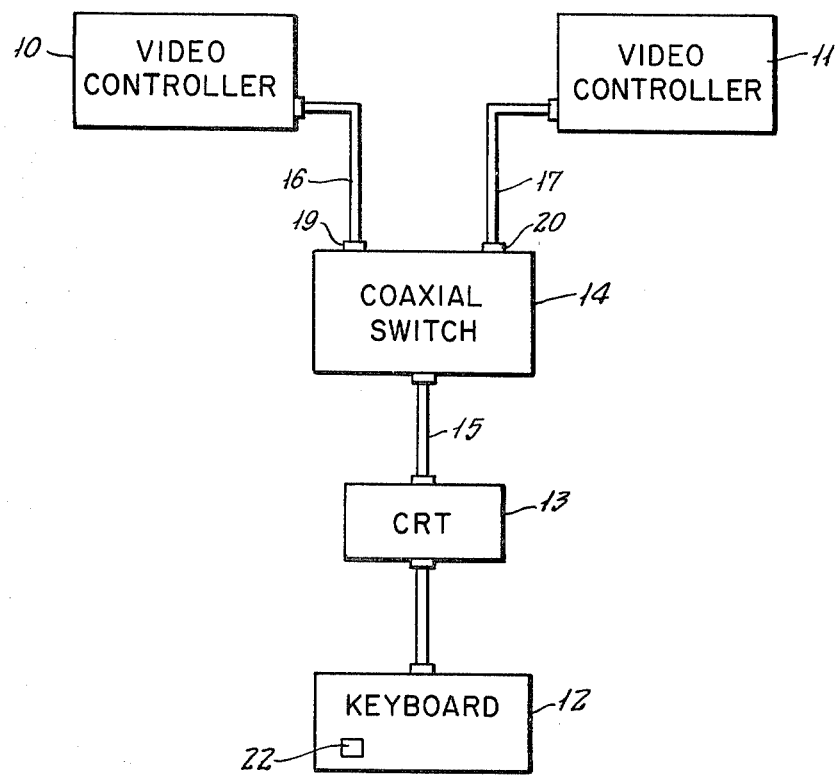
FIG. 1 is a block diagram of a simplified system in accordance with the invention.

Referring now to the drawings, and more in particular to FIG. 1, therein is illustrated a simplified block diagram of a system in accordance with the invention. In general, the system comprises one or more video controllers 10, 11 which may be selectively connected to an input-output terminal and the coaxial switch, and separate coaxial cables 16, 17 are connected between the two output terminals 19, 20 of the coaxial switch and the video controllers 10, 11 respectively.

It will be apparent that the video controllers may be from systems of the same type, such as the Model 82 video controller produced by DATA 100 Corporation of Minneapolis, Minn., and that the coaxial switch may physically be mounted as part of either of the systems or that one or both of the video controllers may be a different type of device, such as the KEYBATCH ® system, also produced by DATA 100 Corporation. It will be apparent that other equipment may alternately be employed. In the above arrangement, the video and raster synchronization data is generated in the video controllers, and applied by way of the coaxial switch and interconnecting cables to the display CRT, for display. Keyboard data for the display of further information is derived from the keyboard, this data being transmitted in coded form by way of the coaxial cables through the coaxial switch to the video controller for storage and later display.

In a system of this type, a determined portion of the signal cycle of the data derived in the video controllers may be reserved for the keyboard signals, in order to enable entry of data from the keyboard. For example, in one example, the video controller may be arranged to produce a raster of 262 scan lines, of which the first 16 are reserved for entry of new data by way of the keyboard.

In accordance with the invention, in addition to the usual keys (not shown) of the keyboard, the keyboard has a further key 22 for producing a switching pulse for application to the common coaxial cable 15. In accordance with one aspect of the invention, as will be disclosed in greater detail in the following paragraphs, the coaxial switch 14 incorporates a detecting circuit for detecting this coaxial switching pulse, as well as a circuit for discriminating the thus detected pulse from other data applied to the coaxial cable 15. The output of the detector and pulse discriminating circuit is then applied to a switch such as a reed relay, for enabling the control of the switches, so that the coaxial cables 16 and 17 are selectively interconnected with the common coaxial cable 15. It is, of course, apparent that other types of switches may alternatively be employed.

In a further feature in accordance with the invention, the pulse control circuit for the coaxial switch 14, or the switch itself, includes a latching means, so that the input-output terminal is alternately connected to the video controllers 10, 11 upon repeated depression of the switch 22 on the keyboard.

In other words, in accordance with the invention, the coaxial cables are employed to enable the passage of keyboard data to the video controllers, as well as to pass the switch control pulses from the keyboard to the coaxial switch. The coaxial switch 14 is responsive to the switching pulses on the common coaxial cable 15, for switching the coaxial switch 14 to its other position, that is, to enable the interconnection of the input-output terminal with the other of the video controllers 10, 11, such interconnection being maintained until a further receipt of a switching pulse by the coaxial switch device.

Figure 2:
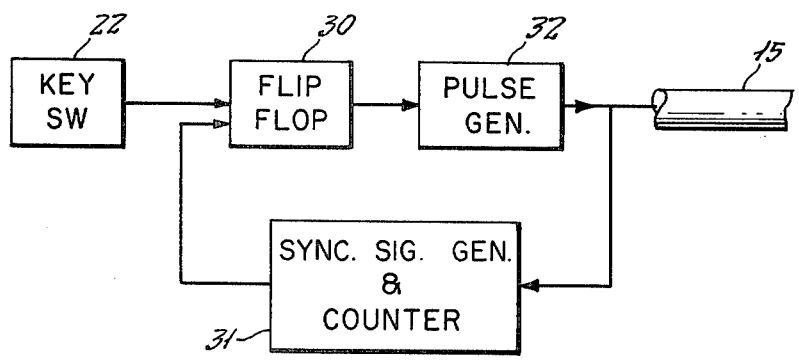
FIG. 2 is a block diagram of a simplified system which may be provided for generating a switching pulse, for use in the system of FIG. 1.

Since the generation of the switch impulse requires synchronization with the video data, in order to avoid interference between the signals, it is apparent that the conventional circuitry may be employed so that a single switch impulse is applied to the common coaxial cable 15 in response to a single depression of the key 22, for effecting a single operation of the switch 14. The method for generating this impulse is not a part of the novel aspects of the present invention, and hence any conventional circuit arrangement may be employed for this purpose. For example only, as depicted in FIG. 2, depression of the key 22 may effect the setting of a flip-flop 30, the flip-flop being adapted to be reset at a determined time in the raster by means of conventional synchronization signal detecting circuits and counter circuit 31, so that the switching pulse is applied to the coaxial cable by a pulse generator 32 at times consistent with the organization of the video data.

Figure 3A:
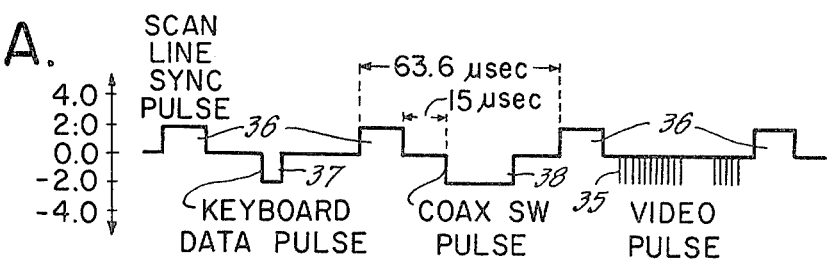
FIGS. 3A-3G are time diagrams illustrating the signals which may occur at various points in a system in accordance with the invention.

An example of a signal format of the above type is illustrated, for example, in FIG. 3A, wherein a video signal from the video controller may be comprised of video pulses 35, for example, for the display of alphanumeric data. The output of the video controller further includes synchronization pulses, such as scan line synchronization pulse 36, of a polarity opposite that of the video pulses. The signals produced by the keyboard circuits comprise keyboard data pulses 37, which may be of the same polarity as the video pulses, and which occur on selected lines during which no video pulses occur. In accordance with the invention, the pulse 38 for operating the coaxial cable switch also occurs in the portion of the video signal during which no video pulses occur, and this pulse may be distinguished from the keyboard data pulses by various techniques, such as, for example, being of a different, preferably greater width. For example, the keyboard data pulses may have widths of 2 microseconds, with the coaxial switching pulses having widths of 15 microseconds in order to enable discrimination of these pulses. While the differentiation between the switching pulses and the data pulses is preferably on the basis of differences in pulse width, in view of the simplification of the techniques required for separating these pulses, it is, of course, apparent that other discriminating techniques may be employed, such as, for example, on the basis of the time at which the pulses occur in the raster.

Figure 4:
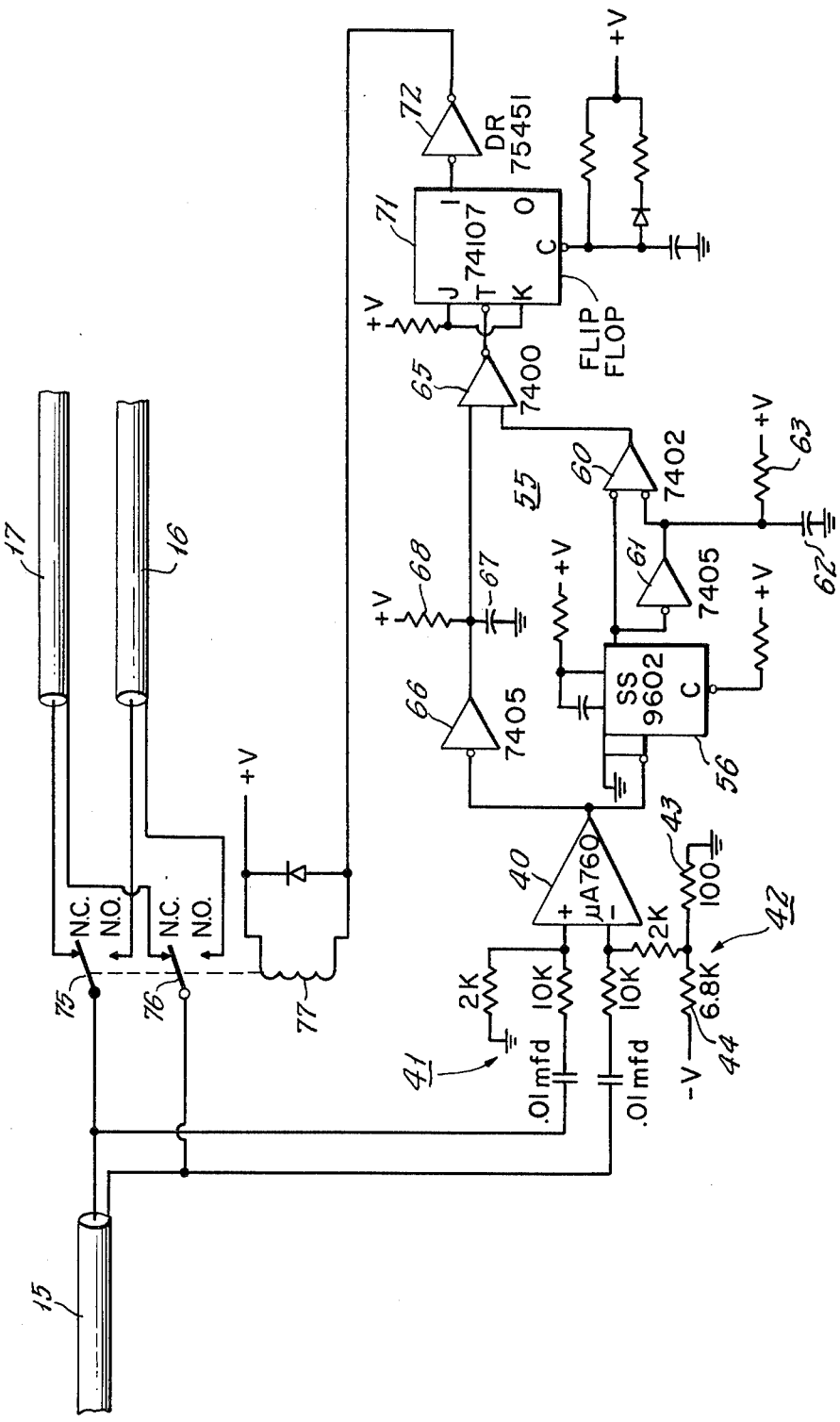
FIG. 4 is a more detailed block diagram of a preferred circuit in accordance with the invention.

Referring now to FIG. 4, therein is illustrated a preferred form of a pulse detecting and switching circuit in accordance with the invention. The system of FIG. 4 is illustrated as being connected between the common coaxial cable 15 on the one hand, and the coaxial cables 16, 17 from the video controllers, on the other hand. In the arrangement of the invention, a differential comparator 40 is provided for selecting one polarity of pulses on the coaxial cable, that is, the polarity of pulses which include the coaxial switching pulses. The differential comparator 40 may, for example, be of a type $\mu$A 760, or type LM 361. The two inputs of the comparator are connected to the center conductor and shield of the coaxial cable 15 by way of similar high impedance circuits 41 and 42 respectively. For example, the center conductor may be connected to the noninverting input of the comparator by way of a series capacitor and series resistor, in that order, with a shunt resistor being connected to reference ground at the comparator input terminal. A similar high impedance circuit is provided between the shield of the coaxial cable 15 and the inverting input of the comparator 40, with the exception that the shunt resistor is connected to the junction of series connected resistors 43 and 44 serving as a voltage divider, the resistors 43 and 44 being connected between a negative supply and ground reference potentials.

The resistor 43 has a resistance that is much less than that of the shunt resistor at the corresponding input of the differential comparator, so that the resistor 43, 44 applies a bias to the input of the differential comparator, without substantially affecting the balance of impedance of the two inputs thereof with respect to any signals therebetween.

Figure 3B:
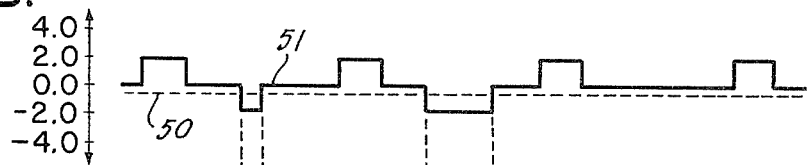

The effect of the provision of the bias voltage on the differential comparator is apparent in FIG. 3B, wherein it is seen that the bias, denoted by the reference level 50, shifts the relative level of the signals denoted by the line 51. This shift more clearly differentiates the base level of the signals from the operating point of the differential comparator, so that the separation of the pulses of opposite polarities by the differential comparator is improved and simplified, without affecting the impedance level of the inputs.

Figure 3C:
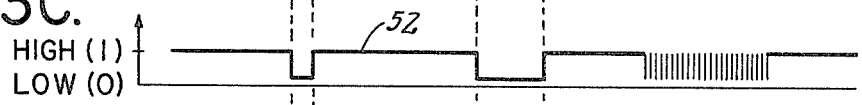

The resultant output of the differential comparator, in this example, is illustrated in FIG. 3C, wherein the signals have negative going pulses corresponding to the keyboard data pulses, the coaxial switching pulses and the video pulses, from the normally high signal level 52.

Figure 5:
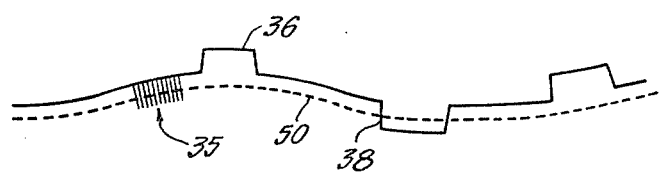
FIG. 5 is a simplified time diagram of a variation of the signals in the system of the invention, in the presence of a substantial common mode signal.

In the above described arrangement, it is to be noted that the differential comparator 40 is connected between the shield and the center conductor of the coaxial cable 15. As a consequence, the circuit rejects common mode signals. For example, if a common mode signal in the form of a sine wave is on the center conductor and a shield of the coaxial cable, as illustrated in FIG. 5, the interconnection of the differential comparator to the coaxial cable will result in the rejection of this common mode component, so that the resultant signals appearing in between the inputs of the differential comparator are those of the type illustrated in FIG. 3B. FIG. 5 also illustrates the effect of the bias in displacing the level of the signals at the differential comparator to simplify the discrimination of the desired pulse signals.

Figure 3D:
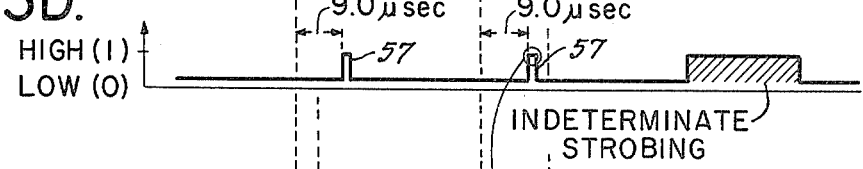

A pulse width discriminator 55 may be provided connected to the output of the differential comparator, if signals of the above disclosed type are employed in the system. In the pulse width discriminator 55, the output signals from the differential comparator are applied to trigger a monostable multivibrator 56 which may, for example, be a type 9602. Thus, each negative transition at the output of the differential comparator fires the monostable multivibrator, to produce an output pulse of, for example, 9 microseconds. This period is set to be greater than the duration of the keyboard data pulses, but less than the duration of the pulses to be detected. At the end of this 9 microsecond period, a strobe pulse 57 is produced, as appears in FIG. 3D. This figure illustrates that strobe pulses will be produced responsive to the keyboard data pulses and the coaxial switching pulses, but that indeterminate strobing results during the time of occurrence of the video pulses. The circuit for generating the strobe pulse of defined pulse width may include a NAND gate 60, the output of the monostable multivibrator 56 being connected both directly and by way of inverter 61 to the inputs of the NAND gate 60. In addition, the output of the inverter 61 is connected to an integrator comprised of a shunt capacitor 62 connected to ground reference, and a shunt resistor 63 connected to the positive supply terminal. This established the desired width of the strobe pulse.

Figure 3E:
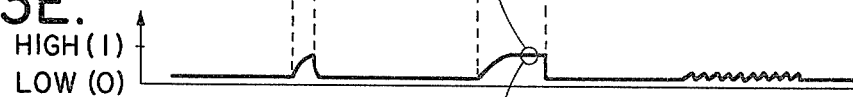
Figure 3F:
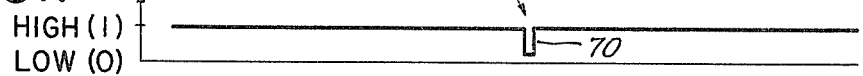

The strobe pulse is applied as one input to NOR gate 65, and the other input to this gate is obtained from the output of the differential comparator, by way of inverter 66. The output of the inverter 66 is also connected to an integrator comprised of shunt capacitor 67 and shunt resistor 68, to aid in the removal of high frequency signals. The output of the inverter 66 appears as illustrated in FIG. 3E. When the strobe signals of FIG. 3D coincide with the signals of the output of the inverter 66, it will be apparent that coincidence pulses 70 will be produced at the output of the NOR gate 65, as appears in FIG. 3F. Such coincidence pulses will not be produced in response to keyboard pulses, which are of too short duration, nor in response to video pulses which are kept suppressed below the TTL logic zero level by the RC network at the output of inverter 66.

Figure 3G:
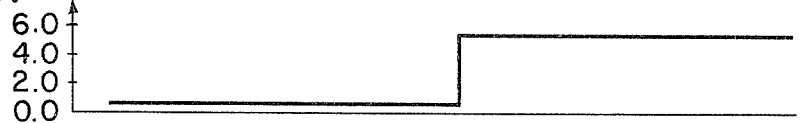

The output of the NOR gate 65 may be applied to a latching circuit in the form of flip-flop 71, to produce an output signal of the form illustrated in FIG. 3G. This resultant signal thereby constitutes a control signal, which may be amplified by a suitable driver 72, such as a type 75451 peripheral driver.

FIG. 4 further denotes various integrated circuits which have been employed in a successful embodiment of the invention.

The switching between the common coaxial cable 15 and the video controller cables 16 and 17 is effected by means of switches 75 and 76 respectively, which may be reed relay contacts controlled by actuating coil 77. In this embodiment of the invention, the output of the driver 72 is employed to energize the coil 77.

As a consequence, in the above described system in accordance with the invention, it is apparent that the switching pulses effect the alternate interconnection of coaxial cables 16 and 17 to the coaxial cable 15.

In the above described system in accordance with the invention, it is apparent that, due to the use of a high impedance input circuit, the coaxial cable switching system disturbs the signals on the coaxial cables to a minimum extent. The differential comparators of the type above disclosed are preferred, since they act fast enough to pass the video signals and high frequency signals. If slow comparators are employed, it is apparent that the video signal may appear as large pulses, and thus be more difficult to discriminate from the coaxial switching pulses. The RC network at the output of the inverter 66 filters out substantially all of the high frequency signals, such as the video signal as discussed above, and passes only the low frequency pulses, such as the switching pulses.

In modifications of the invention, a number of coaxial switches of the above type may be built into a common module, employing a common power supply, and further enabling the interconnection of a plurality of input-output terminals of the above type between a pair of video controllers. In the embodiment of the invention illustrated in FIG. 4, the spring loaded switches 75 and 76 will connect common coaxial cable 15 to the coaxial cable 17, attached to the normally closed side of the switches, in the event of a power failure, and because of a power-on-clear circuit 78 connected to the clear terminal of the flip-flop 71, coaxial cable 15 will be connected to coaxial cable 16 upon the initial application of power.

The coaxial switch arrangement in accordance with the invention is inexpensive and simple to fabricate, and it has the advantage that it is effectively transparent to both the input-output terminal and the controller. Since high input impedance devices are employed to sense the switching signals, the system may be attached anywhere to the coaxial line without disturbing the signal. This eliminates the necessity for amplifying the signal before it is retransmitted, after being received by the coaxial switch. In addition, the coaxial switch does not require an additional set of control wires to control the switching relays, since the control signal is directly obtained from the line that is being switched.

The use of the high input impedance pulse detecting circuit, that is, the use of a differential comparator pulse detector as above described, provides the advantage that the common mode signal on the coaxial cable shield is employed as a reference input to the differential comparator. As a result, a separate reference level obtained by the filtering of the signal on the center conductor and the application of such separate signal to a comparator as a reference is not required. The use of filters is thus obviated in accordance with the invention, by the use of the three level signal, that is the signals on the center conductor and shield of the coaxial cable and the ground reference level. Consequently, amplifying and frequency compensating circuits which must normally be provided in combination with filters, in order to reliably produce a reference signal, are not required. In addition, the pulse detecting circuit of the invention may be produced at substantially lower cost.

While the invention has been disclosed and described with reference to a single embodiment, it will be apparent that variations and modifications may be made therein, and it is intended in the following claims to cover each such variation and modification as follows within the true spirit and scope of the invention.

What is claimed is:

1. A high input impedance pulse detecting circuit for receiving signals, comprising a coaxial cable having an outer conductor and a shield, said outer conductor and shield forming first and second input terminals respectively, differential comparator means having first and second inputs, separate high input impedance means connecting said input terminals to said inputs and having substantially the same impedance, each of said input impedance means comprising a series capacitor and a shunt resistor and a source of direct current connected to offset the direct current level at one of said inputs with respect to the other said input.

2. The pulse detecting circuit of claim 1 further comprising a pulse width discriminating circuit means connected to the output of said differential comparator for providing an output signal.

3. A high input impedance pulse detecting circuit comprising a coaxial cable, a differential comparator means having first and second inputs, separate similar high input impedance means connected to said first and second inputs of said differential comparator and having impedance substantially greater than the characteristic impedance of said coaxial cable, said input impedance means each comprising a series capacitor and a shunt resistor, and means interconnecting said separate input impedance means with the shield and center conductor of said coaxial cable respectively, whereby a common mode signal may be present on said shield and center conductor with respect to a ground reference potential, and further comprising a source of direct current connected to offset the direct current level at one of said inputs with respect to the other said input.

* * * * *